(12) United States Patent
Kirtchik

(10) Patent No.: US 7,733,263 B1
(45) Date of Patent: Jun. 8, 2010

(54) INFRARED CAMOUFLAGE COATING SYSTEM

(75) Inventor: Hyman Kirtchik, Cincinnati, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 05/924,406

(22) Filed: Jul. 11, 1978

(51) Int. Cl.
*H01Q 17/00* (2006.01)

(52) U.S. Cl. .................. 342/2; 342/3; 342/4; 342/13; 428/433; 428/539.5; 427/160

(58) Field of Classification Search ............ 342/1–4, 342/12, 13, 52, 53, 175; 428/433, 539.5; 427/160
See application file for complete search history.

(56) References Cited

U.S. PATENT DOCUMENTS

| | | | | | |
|---|---|---|---|---|---|
| 3,176,679 | A | * | 4/1965 | Langley | 350/1.7 X |
| 3,445,662 | A | * | 5/1969 | Langley | 350/1.7 X |
| 3,614,188 | A | * | 10/1971 | Seeley et al. | 359/359 |
| 3,619,235 | A | * | 11/1971 | Faruuchi et al. | 428/434 |
| 3,682,528 | A | * | 8/1972 | Apfel et al. | 359/360 |
| 3,733,217 | A | * | 5/1973 | Seeley et al. | 427/162 |
| 3,816,271 | A | * | 6/1974 | Greenberg | 205/285 |
| 4,053,662 | A | * | 10/1977 | Bergez et al. | 428/539.5 X |
| 4,924,228 | A | * | 5/1990 | Novak et al. | 342/2 |
| 5,627,541 | A | * | 5/1997 | Haley et al. | 342/1 |
| 6,909,395 | B1 | * | 6/2005 | Carpenter | 342/1 |

* cited by examiner

*Primary Examiner*—John B Sotomayor
(74) *Attorney, Agent, or Firm*—AFMCLO/JAZ; Joseph E. Rusz

(57) ABSTRACT

A camouflage coating system for application to the surfaces of jet engine components in order to reduce their level of emitted energy there by rendering them undetectable by infrared detection systems. The camouflage coating comprises a multilayer system having a first diffusion barrier of nickel aluminide applied to the substrate surface. A second silver reflective layer superimposed on the diffusion barrier layer and a glass-ceramic protective overlay superimposed on the silver reflective layer.

1 Claim, No Drawings

INFRARED CAMOUFLAGE COATING SYSTEM

STATEMENT OF GOVERNMENT INTEREST

The invention described herein may be manufactured and used by or for the Government for governmental purposes without the payment of any royalty thereon.

BACKGROUND OF THE INVENTION

This invention relates to a countermeasure system for protecting jet aircraft and missiles from detection by missile and ground-base infrared detection systems. More particularly, this invention contains itself with a high temperature, low emittance, camouflage coating system which, when applied to the strategic surfaces of aircraft jet engines and missile components, will effectively reduce their level of emitted energy and render them undetectable by missile and ground base detection systems.

Tactical aircraft are prime targets for a variety of infrared seeking missiles and other infrared detection devices. While cruising at altitude or during a low level attack, they are especially vulnerable to air launched missiles such as the Sidewinder or Falcon. In a close support mission, ground launched missiles, like Redeye, provide a very effective defense. The very low cost, ease of operation and the extremely high reliability of these IR missiles make them a threat in all categories of war where tactical aircraft are used.

The feasibility of using low emissivity coatings to suppress the infrared signature of external jet engine components has been demonstrated. The demonstration showed that a low emissivity coating on an external nozzle plug reduced the IR signature for that component significantly. It has been suggested that further suppression can be realized by controlling surface emissivities of internal exhaust system components. For application to advanced jet engines, and particularly for countermeasure purposes, a judicious selection of high and low emissivity coating surfaces on critical components is required to optimize the trade-off between emission and reflection.

The missile's capability to seek and destroy could be nullified if the intensity of engine radiation could be decreased in the missile detector's wavelength and bandwidth of response and the radiation emitted from the engine could be shifted to wavelengths outside of the response range of missile detectors. Ultimately, the reduction of the IR signature requires both the incorporation of efficient cooled exhaust system components and the development of optically, chemically, and mechanically stable emissive/reflective surfaces for them. These must be applicable to existing as well as future turbojet or turbofan engines.

As a consequence, a considerable research effort has evolved in an attempt to develop countermeasures or camouflage materials which, when applied to the strategic surfaces of aircraft jet engines, will effectively reduce their level of emitted energy and render them undetectable by missile and ground-base detection systems. It is important that the dimunition be restricted as much as possible to the 1-6 micron wavelength region, and that the bulk of the radiation be allowed to propagate freely from the aircraft in the other wavelength regimes.

For application to advanced jet engines, and particularly for countermeasure purposes, a judicious selection of high and low emissivity surfaces on critical components is required to optimize the trade-off between emission and reflection. Also, the air-breathing environment limits the utility of coatings previously acceptable for thermal control of space oriented systems. The rigors a coating must endure to operate successfully in a jet engine environment include the influences of thermally induced stress, overtemperature, corrosion, foreign object impact, and the metallurgical instability of coatings. These factors have provided a deterring influence on the use of prior art systems.

In furtherance of the research effort referred to above, and in an attempt to provide a system for preventing infrared detection, it was found that a composite, low emissivity coating system composed of a diffusion barrier coating, a reflective metal coating and a protective overlay coating could be applied to the metal surfaces of jet engine components. The application of the composite coating of this invention to the surfaces of the engine components effectively reduces their level of emitted energy thereby rendering them undetectable by infrared detection systems.

SUMMARY OF THE INVENTION

In accordance with this invention, it has been discovered that a novel composite coating system, when applied to the strategic surfaces of jet engine components, can effectively reduce the level of emitted energy in the 1 to 6 micron wavelength range while, at the same time, allow the bulk of radiation to radiate freely from the aircraft in the other wavelength ranges. The low emittance coating system is applied to the metal surfaces of jet engine components as a multilayer coating. Generally, the engine components are composed of ferritic or nickel base alloys. The first layer of the system is applied to the alloy substrate surfaces as a stable, metal diffusion barrier of nickel aluminide. The diffusion barrier is applied by a pack cementation process, commonly referred to as the CODEP process, a proprietary process of the General Electric Company and more fully described in U.S. Pat. No. 3,668,985.

The second part of the composite coating system is a reflective silver metal layer which is deposited onto the diffusion barrier by conventional liquid metal techniques. The liquid metal consists of silver and silver-organic compounds dispersed within a volatile combination of oils in essentially paint forms. For this invention, a Degussa #242GEII liquid silver containing lead borogermanate as a flux was formulated in order to provide a specific example of the liquid silver metal suitable for use with the invention. However, other reflective liquid silver compositions could be utilized also. The liquid silver was applied by brushing onto the diffusion barrier then dried and fired at 1300° F. by a programmed heating cycle.

The third component of the coating system comprised a protective glass-ceramic overlay which was applied to the silver reflective layer. The glass-ceramic formulation is essentially an amorphous combination containing germanium oxide, lithium oxide, potassium oxide, aluminum oxide, phosphorous pentoxide and abietic acid. This layer possesses excellent transmissivity in the 1-6 region. The components of the glass-ceramic were ground, suspended in a non-aqueous medium and then sprayed on the silvered layer by using conventional state-of-the-art techniques of ceramic enamelling. After firing by normal methods, a post heat treatment cycle was used to effect conversion of the glass by recrystallization to the desirable glass-ceramic form.

The novel composite coating combination of this invention uniquely gives emittance values on the order of 0.2 or less in the important 1-6 micron wavelength region. Except for unusually prolonged high temperature or unrealistic exposures, the coating system was stable and responded excellently to both static and dynamic tests.

Accordingly the primary object of this invention is to develop a stable coating system which, when applied to the strategic surfaces of jet engine components, will effectively reduce their level of emitted energy.

Another object of this invention is to provide a multilayer composite coating system that will effectively camouflage jet engine aircraft against detection from infrared missile and ground-base detection systems.

Still another object of this invention is to provide a low emittance, composite coating system for jet engine components that is composed of several strata of layers that give emittance values on the order of 0.2 or less in the 1-6 micron wavelength range while simultaneously allowing the bulk of radiation to propagate freely from the aircraft in the other wavelength regimes.

The above and still other objects and advantages of the present invention will become more readily apparent upon consideration of the following detailed disclosure thereof.

DESCRIPTION OF THE PREFERRED EMBODIMENTS

With the above-mentioned objects in mind, the present invention contemplates a novel, low emittance, composite coating system comprising a strata of layers for application to the surfaces of jet engine components. Usually the composite coating is applied to temperature resistant ferritic-base alloys such as 321 SS or temperature resistant nickel-base allows such as Rene' 41.

The coating systems is composed of a first layer applied to the surfaces of the alloy substrate and comprises a thin, metal, diffusion barrier of nickel aluminide applied by a conventional pack cementation process commonly referred to as the CODEP process. Superimposed on the diffusion barrier is a thin reflective film of silver metal with a final layer of about 2 mils of a germanium oxide containing glass-ceramic composition superimposed on the silver film. Within the confines of this mention, the diffusion barrier of nickel aluminide was about 1.2 to 1.4 mils thick. Essentially, the pack cementation process converts the surface of the alloy to an enriched nickel aluminide layer. This coating is intuitively bound with a diffusion layer of its own to the alloy substrate by a process requiring 1960° F. Hence, the layer is continuously stable at the normal operating temperatures for jet engines. The CODEP process is a proprietary process of the General Electric Company. It was discovered that this coating prevented the diffusion of reflective metallic overlays into the substrate.

The reflective metal overlay consisted of silver metal deposited by conventional liquid metal techniques. The liquid metal consists of silver and silver-organic compounds dispersed within a volatile combination of oils in essentially paint form. The mix also contained a flux so that upon subsequent firing, adherence to metallic or ceramic bodies was obtained. For this invention, a special Degussa #242GEII liquid silver containing lead borogermanate as the flux was developed. The basic product is obtainable from Materials For Electronics, Inc., Jamaica, N.Y., as Degussa #242L which normally contains lead borosilicate. It was modified by substituting lead borogermanate. The substitution provided for improved emittance in the 1 to 6 micron region. The liquid silver was brushed onto the CODEP coated metal, then dried and fired at 1300° F. by a programmed heating cycle. The result was a coating that adhered to the CODEP without diffusing into it and one that had excellent reflective properties per se. Since the silver layer also contained the flux, adherence of this noble metal to the thick glass-ceramic protective overlay was found to be effective.

The third component of the coating system comprised a protective overlay of an amorphous germanium oxide-containing glass formulation with abietic acid to keep the glass in reduced form. Approximately, 2 mils of overlay have been found to be effective.

The alloys chosen as substrates for the coating composite of this invention exhibit significant mechanical properties at elevated temperatures. Sufficient design data, performance experience, and metallurgical knowledge exist concerning these alloys. In addition, 321 SS and Rene' 41 are representative of classes of alloys to assure that the coating/base metal data generated for them have applicability to similar compositions. While the requirements for the component material are diverse, a simple coating may be suitable for more than one engine component providing it satisfies the most severe requirements of them.

It is also important to recognize that the coatings of this invention are directed at the final metallurgical form of the substrates to which "attachment" is contemplated. "As-received" material must, in general, be properly heat treated. The subsequent chemical surface treatment and coating applications are then more realistic.

For the coating applications of this invention, the following treatments were performed. All panels were heated as noted. In the first pretreatment heat procedure, Rene' 41 was heated at 1975° F. for 30 minutes plus 1400° F. for four hours. Complicated structures are first stabilized in temperature at 1200° F. and then transferred to another furnace which is superheated at about 2100° F. This allows the component to rise in temperature as rapidly as possible through the 1200-1850° F. range. The furnace control is then adjusted to prevent the temperature of the parts from rising above 1975° F. They are held at temperature for 30 minutes and then furnace cooled to about 500° F. to prevent thermal gradients which lead to cracking. The parts are then taken up to 1400° F. in a single furnace and held for 16 hours.

An alternative heat treatment maybe utilized in which the base alloy is heated to 2050° F. for 30 minutes plus 1600° F. for four hours. The same follow on treatment as in the above heat treatment method is employed.

The 321 SS alloy substrate is annealed at 1825° F.±25° F. followed by an air cool as the conventional heat treatment. Thin dielectric films or intermetallic films have been used as successful barriers to the diffusion of certain noble metals, such as gold. The alloying elements in the substrate diffuse into the noble metals at elevated temperatures. The applications, in general, have been limited to space environment use. However, the oxide-type barriers previously used do not have the necessary thickness to prevent diffusion nor have the mechanical integrity under thermal cycling conditions encountered within the operational environment of jet engines.

The diffusion barriers considered ideal are those which themselves are first diffusion bonded to the substrate metal. These may be metals or intermetallic compounds, each of which are electrically conductive and allow for the superimposition of other metals, which can in turn be diffusion bonded.

Extensive development has been carried out in an attempt to provide a barrier system that would prove to be an effective component in a multilayer or multicomponent countermeasure system. Previous work has shown that pack cementation methods for producing coatings containing nickel and aluminum led to not only corrosion resistant surfaces but those whose mechanical properties did not adversely affect the substrate. More important for this invention was the indication that coated parts could be joined by high temperature noble metal-containing brazes without penetration of the coating above 1900° F. The investigations culminated in the development of a pack cementation process for the application of a so-called CODEP series of coatings for both nickel and cobalt-base alloys. The CODEP coatings are based primarily on aluminum deposition by a halogen carrier to form the inter-metallic compounds, NiAl and Ni$_3$Al, in the coatings. Chromium, molybdenum, and cobalt are found in the coating if these elements are present in the base metal.

The coating is produced in a pack mixture consisting of a Ti—Al—C alloy powder, an Al$_2$O$_3$ filler, and an NH$_4$Cl activator. The process consists of packing the alloy metal with the above mixed reagents, heating to a specified temperature, with or without a hold at that temperature, and then cooling. The result is a surface conversion consisting of a distinct outer coating layer and a prominent diffusion zone. It is this combination which acts as a diffusion barrier to the reflective metal layer which forms the second layer of the composite coating system of this invention. The CODEP technique is a proprietary process of the General Electric Company and is more fully described in U.S. Pat. No. 3,667,985. In order to test the effectiveness of the CODEP coating, as applied to this invention, three separate runs were made on a conventionally electropolished Rene'41 and 321 SS panels (1×4×0.060 inch). These are tabulated in Table I. The table also records the micrometallographic mount numbers and thickness measurements after heat treatments chosen to realistically simulate upper temperature limitations in engine runs. Since the diffusion barrier coating will not "see" a normal oxidizing environment, the CODEP coated Rene' 41 and 321 SS panels (1×4×0.060 inch) were heated in a Brew vacuum furnace at 10 torr for 150 hours at 1200° F. A separate set of coated panels were heated similarly for 50 hours at 1500° F. The analytical results suggest a stable system under the operating conditions expected. In lieu of an electropolishing treatment for the surfaces of the alloy substrates a conventional vapor blasting treatment may be employed, if desired.

The Applied Research Laboratory EMX Electron Microprobe Analyzer was used to characterize compositional changes in the CODEP coating after the separate life testing at 1200° F./150 hrs in vacuum and 1500° F./50 hrs vacuum, respectively. The sample mounts from metallographical examination were used at 45° to the 1 micrometer beam in the $10^{-6}$ torr system.

A step scanner which types out counts/second was used at 5 distances between recordings. For a typical example, the Rene'41 "as received" read-out is shown in Table II. The continuous gradation of aluminum from the outer layer inwards is noticeable. On the other hand, the nickel content on the outer layer assumes that of the substrate while diminshing in the diffusion zone. Typical analyses of Rene'41 show 55% Ni and 1.5% Al. The uncorrected values given in Table II and Table III for the matrix simulate the parent alloy composition. In Table II, the average readings of the matrix is 0005465. This value multiplied by 100 and divided by the average value of the nickel standard 0009556 equals 57.2%.

From Table III the excellent stability of the coating can be inferred from the practical constancy of the nickel and aluminum values. The 321SS (CODEPPED for the first time) indicates that the bulk of the diffusion zone (except after 50 hrs/1500° F.) is neither nickel nor aluminum.

TABLE I

Process Cycles for CODEP Coating of Rene'41 and 321SS
Including Subsequent Diffusion Rate Studies

| Sample Code | Alloy | Processing Cycles °F. | As Rec'd Mnt # | Thick./Mils D.F. | O.I. | After 1200° F./ 150 Hrs Mnt # | Thick./Mils D.F. | O.I. | After 1500° F./ 50 Hrs Mnt # | Thick./Mils D.F. | O.I. |
|---|---|---|---|---|---|---|---|---|---|---|---|
| 4CD-b-02 | R'41 | 0 Hrs/1950 | H7578 | .13 | .20 | H7825 | .30 | .20 | H7875 | .40 | .20 |
| 2CD-b-11 | R'41 | 1 Hr/1950 | H6643 | .60 | .40 | H7826 | .60 | .60 | H7584 | .60 | .60 |
| 6CD-b-12 | R'41 | 4 Hrs/1950 | H7579 | 1.00 | 1.00 | H7824 | 1.20 | 1.00 | H7977 | 1.40 | 1.10 |
| 4CD-a-0 | 321SS | 0 min/1780 23-25 min. Heat-up | H7580 | .40 | .20 | H7822 | .70 | .20 | H7976 | 1.50 | .20 |
| 5CD-a-11 | 321SS | 5 min/1840 30-35 min. Heat-up | H7581 | 1.00 | .50 | H7821 | 1.10 | .50 | H7979 | 1.70 | .50 |
| 6CD-a-12 | 321SS | 60 min/1840 | H7582 | 2.00 | .80 | H7823 | 2.00 | .60 | H7978 | 2.40 | .70 |

TABLE II

Compositional Changes in "As-Received" CODEP Coated Rene' 41
Step Scanner Results on Nickel and Aluminum
(All Counts 5 Microns Apart and Taken from Matrix to Outside Edge - Mount #6643)

| Nickel Variation Counts/Second | | Aluminum Variation Counts/Second | |
|---|---|---|---|
| 0005539 | | 0000680 | |
| 0005570 | | 0000771 | |
| 0005568 | | 0000732 | |
| 0005634 | Rene' 41 | 0000811 | Rene' 41 |
| 0005497 | Matrix | 0000841 | Matrix |
| 0005640 | Average | 0000998 | Average |
| 0005416 | 57.2% Ni | 0000989 | 1.87% Al |
| 0005442 | | 0001154 | |
| 0005282 | | 0001413 | CODEP Diffusion |
| 0005351 | | 0001305 | Zone |
| 0005168 | | 0001911 | Average |
| 0003348 | | 0002338 | 4.07% Al |
| 0003149 | CODEP | 0002711 | |
| 0003249 | Diffusion Zone | 0003559 | |
| 0003186 | Average | 0003873 | |
| 0004139 | 37.1% Ni | 0004863 | Outer CODEP |
| 0004173 | | 0006173 | Layer |
| 0005881 | | 0006574 | Average |
| 0005935 | | 0006981 | 13.87% |
| 0006089 | | 0007770 | |
| 0006092 | Outer | 0007744 | |
| 0006026 | CODEP Layer | 0007822 | |
| 0005929 | Average | 0000579 | No Coating |

TABLE II-continued

Compositional Changes in "As-Received" CODEP Coated Rene' 41
Step Scanner Results on Nickel and Aluminum
(All Counts 5 Microns Apart and Taken from Matrix to Outside
Edge - Mount #6643)

| Nickel Variation Counts/Second | | Aluminum Variation Counts/Second | |
| --- | --- | --- | --- |
| 0005917 | 62.3% Ni | | |
| 0005744 | | | |
| 0000140 | No Coating | | |
| 0009370 | | 0044630 | |
| 0009557 | | 0044508 | |
| 0009651 | Pure | 0044392 | Pure |
| 0009661 | Nickel | 0043813 | Nickel |
| 0009314 | Standard | 0042298 | Standard |
| 0009568 | | 0044874 | |
| 0009555 | | 0045060 | |
| 0009485 | | 0044792 | |
| 0009641 | | 0044440 | |
| 0009556 | Average | 0044689 | |
| 0044350 | Average | | |

TABLE III

Diffusion Studies of CODEP on 321 SS and Rene'41
Microprobe Analyzer Results of Nickel and Aluminum

| | Mount | Matrix[1,2] | | Diff Zone | | Outer Coating | |
| --- | --- | --- | --- | --- | --- | --- | --- |
| Alloy | No. | % Ni | % Al | % Ni | % Al | % Ni | % Al |
| Rene' | | | | | | | |
| As-Received | H6643 | 57.2 | 1.87 | 37.1 | 4.07 | 62.3 | 13.87 |
| After 150 hrs/ 1200° F. | H7826 | 58.9 | 1.45 | 32.0 | 2.18 | 61.4 | 6.71 |
| After 50 hrs/ 1500° F. | H7584 | 59.1 | 1.52 | 35.3 | 2.39 | 57.0 | 9.25 |
| 321 SS | | | | | | | |
| As-Receives | H7581 | 9.6 | 0.82 | — | — | 7.5 | 2.09 |
| After 150 hrs/ 1200° F. | H7821 | 8.4 | 0.91 | — | — | 7.1 | 2.69 |
| After 50 hrs/ 1500 ° F. | H7979 | 7.8 | 0.85 | 8.7 | .89 | 17.7 | 2.53 |

[1] Near diffusion zone (within to microns)
[2] All results derived by direct proportion of counts related to pure nickel and aluminum standards The second component of the multilayer camouflage of the multilayer camouflage coating system of this invention comprises a reflective metal film which is superimposed on the diffusion barrier layer. The silver is deposited in accordance with acceptable liquid metal coating techniques. A Degussa #242L liquid silver was deposited on both Rene' 41 and 321 SS discs having CODEP diffusion barriers on them. This preparation is a suspension manufactured by the Degussa Ceramic Colours Department, West Germany, and obtained through the Materials For Electronics, Inc., New York. By using brushing techniques, thicker films on the order of 30-100 microns can be obtained with one application of the organic material. Since proper optical and adherence properties are obtained. The liquid silver approach is attractive as a deposition process.

The 242L silver was deposited as follows. First, the diffusion barrier coated disc was cleaned with acetone, then air dried. Next, it was brushed with the Degussa #242L liquid silver with a camel's hair brush stroking once over. Thirdly, it was dried thoroughly (to a varnish finish) at room temperature. Finally, it was transferred to an oven and then a furnace having good air flows and gradual heat, using the following approximate cycle:

| t (minutes) | T F |
| --- | --- |
| 0 | RT (Oven) |
| 15 | 120 |
| 20 | 180 |
| 25 | 210 |
| 45 | 310 |
| 55 | 425 |
| 60 | 500 (Furnace) |
| 75 | 760 |
| 85 | 850 |
| 90 | 900 |
| 95 | 1100 |
| 105 | 1100 |
| 120 | 1250 |

Repeat starting with step 3 if a second coat is desired.

Reference to Table IV shows excellent low emissivity in the 1-6 micron wavelength region.

The discs were heated at 1000° F./50 hours in vacuum at $10^{-3}$ Torr. After measuring the emittance values, the same discs were given an additional heat exposure at 1200° F./50 hours in vacuum. The emissivities were obtained and the results for systems 12S and 13S, are shown in Table V. Excellent results were obtained for both systems. The same discs were then exposed to 1400° F./50 hours in vacuum. The bulk of the silver coating disappeared by distillation; hence,

TABLE IV

Diffusion Barrier—Reflective Metal Interaction Using Liquid Silver #242L[1]
Emittance Measurements Related to Elevated Temperature Exposure

| System Number | Substrate Alloy | Diffusion Barrier | Exposure Time (Hrs.) | Exposure Temp. ° F. | Spectral Normal Emittance at (Microns) | | | | | | | | | |
| --- | --- | --- | --- | --- | --- | --- | --- | --- | --- | --- | --- | --- | --- | --- |
| | | | | | 1. | 2 | 3 | 4 | 5 | 6 | 7 | 8 | 9 | 10 |
| 12S | Rene'41 | CODEP | — | RT | .155 | .170 | .140 | .120 | .100 | .095 | .080 | .080 | .080 | .065 |
| | | | .50 | 1000 Vac. | .145 | .155 | .140 | .115 | .105 | .095 | .075 | .085 | .080 | .080 |
| | | | .50 | 1200 Vac. | .135 | .155 | .125 | .105 | .090 | .080 | .080 | .070 | .065 | .060 |
| 13S | 321 SS | CODEP | — | RT | .155 | .170 | .140 | .120 | .100 | .095 | .080 | .080 | .080 | .065 |
| | | | .50 | 1000 Vac. | .155 | .160 | .145 | .145 | .105 | .095 | .090 | .090 | .085 | .080 |
| | | | .50 | 1200 Vac. | | | | | | | | | | |

[1] About .5 mil Degussa Silver, brushed, one coat no further emittance measurements were made. Spectrographic analysis of the silver showed the absence of rhodium. As will be indicated hereinafter, the interaction of the 242L silver with a glass-ceramic overlay was good.

It was also found that the Degussa 242L liquid silver, in brushed form, reacted favorably with both CODEP coated 321 SS and Rene'41 and with the #1768 ceramic glass overlays of Table VI. This glass contained germania as a direct substitute for silica so as to yield favorable transmittancy at 6 microns instead of 5 microns. It was presumed that the normal fluxing agent, common to the usual liquid metal preparations, namely lead borosilicate, might contribute slightly to earlier cut-off than 6 microns. To this end an investigation followed to determine whether the substitution of silica by germania would be advantageous emittance-wise or even decrease the solubility of silver in the glasses. An apparent anomaly exists in that the reflective metal (silver, or for that matter aluminum, copper, or gold) must react somewhat with the overlay to give adherence yet at the same time occur at a very slow rate so that the dissolution does not opacify the interface in the 1-6 microns wavelength region.

For substitute preparations, three germanium-bearing compounds were used in place of the lead Borosilicate Flux present in the Degussa #242L liquid silver. The following were prepared by formulation and processing methods proprietary to Materials for Electronics, Inc., Jamaica, N.Y., agents for Degussa Ceramic Colour Department, West Germany:

242GEI—Barium Borogermanate
242GEII—Lead Borogermanate
242GEIII—Potassium Lead Germanate To compare the emittance values, 321 SS discs with 242L, 242GEI, 243GEII, and 212GEIII were prepared. CODEP was used as a diffusion barrier. The silver preparations were deposited similarly as follows. First, the diffusion barrier coated disc was cleaned with acetone. It was then air dried. Thirdly, it was brushed with Degussa liquid silver with a camel's brush stroking once over. Then it was dried thoroughly (to a varnish finish) at room temperature. Fifthly, it was transferred to an oven and then a furnace having good air flows and gradual heat, using the following approximate cycle:

| t (minutes) | T-° F. |
|---|---|
| 0 | RT (Oven) |
| 15 | 120 |
| 20 | 180 |
| 25 | 240 |
| 45 | 340 |
| 55 | 425 |

-continued

| t (minutes) | T-° F. |
|---|---|
| 60 | 500 (furnace) |
| 75 | 760 |
| 85 | 850 |
| 90 | 900 |
| 95 | 1100 |
| 105 | 1100 |
| 120 | 1300* |

* For the #242GEIII liquid silver, the final firing temperature was 1200° F. instead of the usual 1300° F. If a second coat is desired, the process can be repeated starting with step 3.

The results are compiled in Table V for the CODEP diffusion barrier. As a general conclusion, the emittance values for #212GEI and #242GEII are practically equivalent, while those for #242GEI and #242GEIII are slightly higher. All things being equal, the use of #242GEII would appear advantageous over #242L because of the absence of silica.

The third component or protective glass-ceramic overlay, of the multilayer coating system of this invention was superimposed over the reflective silver metal film layer. The glass formulation is shown in Table VI. Its formulation is essentially an amorphous combination containing germanium oxide in place of the usual silica dioxide normally found in such glasses. In addition, abietic acid is added to keep the glass in reduced form in order to retard the eventual uptake of silver from the reflective layer which would nullify the final product. This product showed excellent stability in the 1-6 micron wavelength region. Other suitable glass composition are also shown in Table VI although the abietic formulation referred to as #1877 is preferred.

TABLE VI

| Compound | #1768 | #1877 | #1879 |
|---|---|---|---|
| $GeO_2$ | 66.7 | 61.7 | 65.7 |
| $Li_2O$ | 25.1 | 24.5 | 26.7 |
| $K_2O$ | 3.3 | 3.2 | 3.4 |
| $Al_2O_3$ | 3.8 | 2.5 | 2.5 |
| $P_2O_5$ | 1.1 | 1.1 | 1.1 |
| Al | — | — | 0.6 |
| Abietic Acid | — | 4.0 | — |

(1) Mole Percent Additions

TABLE V

Emittance Studies of Degussa Special Reflective Liquid Metals
Comparison of Four Silver Preparations on CODEP Coated 321 SS

| Barrier | Reflective | Spectral Normal Emittance at (Microns) | | | | | | | | | |
|---|---|---|---|---|---|---|---|---|---|---|---|
| Layer | Metal | 1+ | 2 | 3 | 4 | 5 | 6 | 7 | 8 | 9 | 10 |
| CODEP | 242L | .160 | .170 | .150 | .135 | .115 | .110 | .090 | .090 | .085 | .080 |
| CODEP | 242GEI | .190 | .200 | .180 | .155 | .135 | .120 | .155 | .150 | .130 | .125 |
| CODEP | 242GEII | .165 | .175 | .155 | .135 | .115 | .110 | .090 | .090 | .085 | .080 |
| CODEP | 242GEIII | .205 | .115 | .185 | .165 | .145 | .135 | .130 | .120 | .135 | .125 |

TABLE VII

Emittance of CODEP Coated Rene'41 Plus Four Deguss Liquid Silvers In Conjunction with #1877 Glass[1] and Elevated Temperature Static Oxidating Tests

| Degussa Silver | Static Test Temp Test | 1+ | 2 | 3 | 4 | 5 | 6 | 7 | 8 | 9 | 10 |
|---|---|---|---|---|---|---|---|---|---|---|---|
| 242L | RT | .255 | .245 | .235 | .205 | .230 | .285 | .500 | .470 | .785 | .850 |
| 242GEI | RT | .250 | .240 | .230 | .200 | .225 | .285 | .270 | .710 | .830 | .915 |
| 242GEII | RT | .235 | .235 | .220 | .180 | .200 | .250 | .430 | .415 | .795 | .885 |
| 242GEIII | RT | .305 | .300 | .300 | .250 | .265 | .340 | .485 | .415 | .785 | .855 |
| 242L | 500° F./250 hrs. | .255 | .240 | .220 | .185 | .185 | .200 | .365 | .360 | .565 | .640 |
| 242GEI | 500° F./250 hrs. | .275 | .265 | .255 | .220 | .225 | .365 | .640 | .605 | .730 | .820 |
| 242GEII | 500° F./250 hrs. | .235 | .225 | .205 | .175 | .200 | .245 | .440 | .425 | .775 | .865 |
| 242GEIII | 500° F./250 hrs. | .305 | .300 | .275 | .250 | .270 | .320 | .515 | .440 | .825 | .900 |
| 242L | 1000° F./150 hrs. | .300 | .295 | .270 | .215 | .260 | .300 | .450 | .420 | .725 | .780 |
| 242GEI | 1000° F./150 hrs. | .395 | .390 | .375 | .365 | .390 | .420 | .600 | .600 | .815 | .795 |
| 242GEII | 1000° F./150 hrs. | .255 | .245 | .220 | .185 | .200 | .245 | .440 | .380 | .735 | .800 |
| 242GEIII | 1000° F./150 hrs. | .325 | .320 | .290 | .265 | .285 | .335 | .510 | .505 | .840 | .880 |

[1]Recrystallized at 1110° F./1 hr.

TABLE VIII

Emittance Cut-Off Data Using Degussa #242GEII Liquid Silver on CODEP Coated Rene' 41 and Glasses Recrystallized at 1110° F./1 Hr.

| Glass | Spectral Normal Emittance | | | |
|---|---|---|---|---|
| | 4a | 5a | 6a | 7a |
| #1842 | | | | |
| RT | .180 | .200 | .250 | .430 |
| After 500° F./250 hrs. | .175 | .200 | .245 | .440 |
| After 1000° F./150 hrs. | .185 | .200 | .245 | .410 |
| #1879 | | | | |
| RT | .195 | .205 | .260 | .410 |
| After 500° F./250 hrs. | .195 | .190 | .225 | .375 |
| After 1000° F./150 hrs. | .190 | .200 | .265 | .400 |

Tests were performed with #1877 glass and #1879 glass as overlays on CODEPPED Rene'41 coated with the four Degussa silver preparations. As before, tests at elevated temperatures were made, that is to say, air oxidation at 500° F. for 250 hours and another set at 1000° F. for 150 hours. The results are given in Table VII. The data re-emphasizes the utility of #242 GEII over its silica-bearing #242L counterpart.

This position of the work coupled with the method of keeping the glass in a reduced form is considered very significant for the design of a low emittance coating system. Table VIII shows some rather remarkable results obtained in the important 1-7 micron region. The glass overlay was applied to the substrate in accordance with the following procedure.

An optimized spray mix of #1877 glass was prepared with enough –100 mesh glass #1877 and acetate-cellulose solution to fill a spray gun container. It was mixed together in a glass jar and rolled on a ball mill rack. The ratio of glass to liquid was determined by the specific gravity desired. All work done in this study was with a slip having a specific gravity of 1.033 to 1.32. The ratio of glass to liquid was:

60 ml Iso-Pentyl Acetate—Ethyl Cellulose
100 gms. #1877 Glass –100 mesh

Rolling the mixture for 30 minutes on the ball mill rack was sufficient to produce a homogeneous slip. It was then sprayed on using conventional spray techniques. An overlay of approximately 2 mils thickness proved desirable.

From a consideration of the foregoing, it can be seen that the present invention provides a novel system for protecting jet aircraft against detection by missile and ground-base infrared detection systems. The unique combination of coatings gives emittance values in the order of 0.2 or less in the important 1 to 6 micron wavelength region.

While the principles of the present invention have been described with particularity, it should be understood that various alterations and modifications can be made without departing from the spirit of the invention, the scope of which is defined by the appended claims.

What is claimed is:

1. A low emittance, camouflage, composite coating system for application to jet engine component surfaces in order to reduce their level of emitted energy to a value on the order of 0.2 in the one to six micron wavelength regime and render them undetectable by missile and ground-base infrared detection systems which comprises:

(1) a metal alloy substrate;
(2) an intermediate coating of nickel aluminide, diffusion bonded into the top surface of said substrate to form a coating about 1.2 to 1.4 mils in thickness;
(3) a layer of a reflective germanium containing, silver metal coating about 0.5 mils thick superimposed on and bonded to said intermediate coating; and
(4) a germanium containing, glass-ceramic, protective overlay coating about 2.0 mils thick superimposed on and bonded to said silver reflective coating.

* * * * *